July 14, 1931.  A. C. ESTEP  1,814,676
INTERNAL COMBUSTION ENGINE
Filed March 7, 1923   5 Sheets-Sheet 1

Fig.1

INVENTOR
Adrian C. Estep.
BY
James C. Sproll
ATTORNEY

Patented July 14, 1931

1,814,676

UNITED STATES PATENT OFFICE

ADRIAN C. ESTEP, OF SEATTLE, WASHINGTON

INTERNAL COMBUSTION ENGINE

Application filed March 7, 1923. Serial No. 623,418.

The present invention relates to improvements in internal combustion oil engines of the type wherein the compression of the air occurs about coincidently with the direct or solid injection of the fluid fuel, at or about compression dead center, causing the combustion thereof, and the object of the invention is to substantially simplify and improve oil engines of this type by embodying therein certain novel features of construction and operation designed to materially increase the thermal efficiency, economical operation and reliability of the same.

With these ends in view the invention is concerned primarily in the provision of an oil engine embodying a symmetrical and substantially spherical combustion chamber, combined with a novel method of injection and a novel form of working face for the piston co-operating with a novel form of axially aligned valve adapted to function as an inlet-outlet valve for said combustion chamber and arranged to control the passage of starting air and combustion air thereto and the exhaust gases therefrom, with such a combination and arrangement of combustion controlling factors that the maximum turbulence or agitation of the combustion air is created within the combustion chamber during compression at or about the injection period, thereby securing the maximum atomization and distribution of the fuel, and a thorough scavenging of the said combustion chamber following the power stroke.

The invention further consists in the provision of an oil engine adapted to utilize heavy asphaltum or tar oils as fuel and to accommodate said engine to efficient operation on such fuel, an insertible and removable liner of heat resisting metal is disposed within the combustion chamber thereof to thereby substantially insulate the combustion air from the water jacketed walls of said chamber and to protect said walls from the intense heat of combustion, further to expedite combustion by raising the temperature of the gaseous mixture prior to combustion, whereby the complete combustion of the said heavy fuel oils is accelerated, thus resulting in materially reducing the consumption of fuel and preventing formation of carbon deposits upon the interior surfaces.

The invention still further consists in the provision of an oil engine employing an interchangeable valve unit embodying the valve controlling system of the engine in combination with a cylinder head having an axially aligned opening adapted to receive said valve unit, which unit is so arranged that the same may be readily inserted in and removed from the cylinder head without materially dismantling the associated parts of the engine; a further advantage obtained in employing such a valve unit is that the incoming combustion air immediately following the egress of hot exhaust gases will materially reduce the temperature of said valve and appurtenant parts, to thereby prevent warping and fouling of said valve ordinarily caused by excessive heating.

The invention still further consists in the provision of an oil engine embodying a novel construction and arrangement of fuel feeding mechanism, which mechanism is readily accessible and adjustable at the will of the operator to feed the fuel in properly regulated quantities and is also under the automatic control of the engine governor.

The invention still further consists in the provision of an oil engine embodying a novel construction and arrangement of air starting mechanism adapted for embodiment within, the valve unit to automatically control and be similarly controlled thereby during the air starting period.

With the foregoing in view the invention resides in the novel construction, combination, adaptation and arrangement of parts, as will hereinafter be more fully described and succinctly defined in the appended claims.

Referring now to the accompanying drawings wherein is illustrated the specific form of the invention, as at present preferred.

In the accompanying drawings and in the following description I have elected to illustrate and describe the invention as embodied in a two cylinder engine, but manifestly the improvements may be embodied in an engine having one or any number of cylinders without departing from the spirit of the invention, the present showing being merely by way of illustration, and inasmuch as the cylinders and associated mechanism are identical in construction, a description of one will suffice for all.

Referring to the accompanying drawings wherein like reference characters designate like parts throughout the several views, the numeral 20 designates the base or crank case of the engine, which as above indicated may be suitably designed for any number of cylinders depending upon the horse power required to be developed and upon this base the water jacketed engine cylinder or cylinders 21 are mounted. Within each cylinder is fitted a piston 22 adapted to be connected by a rod 23 to the crank shaft 24 journalled in the engine base 20. The piston 22 is provided with a frustro-conical working face having an axially disposed concavity 25 formed therein and at top dead center approaches close to the correspondingly coned wall 26 of the cylinder head structure, which latter contains within itself the combustion chamber proper and its several appurtenant parts.

The cylinder head structure comprises an annular water-jacketed spacer 27 and a substantially cylindrical head 28, said spacer and head are adapted to be fixedly secured in axially aligned relation upon the cylinder 21 by stud bolts 29. The annular spacer 27 is provided with a concentric, downwardly convergent seat 30, see Figure 4, adapted to effect a juncture with the coned wall 26 at a point substantially midway of the height of said spacer, to form a throat 31, the area of which is considerably less than the area of the engine cylinder. Within the seat 30 may be fitted a liner or bushing 32, of heat resisting metal, said liner having an inverted frustro-conical exterior designed to fit the water-jacketed downwardly convergent seat 30 and a partially spherical interior, the center of which is in a plane slightly above the plane of the upper end of the liner, to thereby provide a greater thickness of metal for the lower or throat end 33 of the liner, which is normally subjected to the greatest heat. Said liner constitutes the lower and major portion of the combustion chamber and is readily interchangeable and replaceable by liners of varying internal dimensions to increase or decrease the size of the combustion chamber. When the liner 32 is omitted, the area of the spacer throat 31 is reduced to substantially the area of the liner throat 33. It will be noted by referring to Figure 4 that the cylinder proper communicates with the combustion chamber through the throat 33, which latter is substantially closed by the end of the piston 22 when in its top dead center position, and when in such position the concavity 25 thereof in conjunction with the partially spherical interior of the liner 32 forms a symmetrical and substantially spherical combustion chamber 34.

The cylinder head 28 is a substantially cylindrical water-jacketed body of simple design having a central opening 35 extending therethrough adapted to coincide and communicate with the combustion chamber 34, the lower or frustro-conical portion 35' of said opening forming and constituting the upper portion of said combustion chamber. Said opening is also adapted to communicate with an exhaust passage 36 formed integral in the head 28 and connected through a passageway 37 to the exhaust manifold 38 of the engine.

The valve controlling system of the engine is embodied within an interchangeable valve unit comprising a lower casing or cage 39 and an integral upper casing 40, within and upon which are formed and disposed the several passageways and valves constituting the said system. The casing 39 is adapted to be disposed and seated within the opening 35 of the cylinder head 28, substantially in the manner illustrated in Figure 4, while, the integral upper casing 40 is adapted to be substantially superposed upon the said head 28 and fixedly secured thereto by stud bolts 41.

The casings 39 and 40 are provided with a central passageway 42 adapted to communicate at the lower end thereof and at proper intervals with the combustion chamber 34 by means of an axially aligned valve 43 arranged to cooperate with an annular seat 44 formed within the lower end of said casing. The disk shaped head of the valve 43 virtually constitutes the entire upper wall of the combustion chamber 34, since the diameter of said chamber is only slightly greater than the diameter of said valve. The lower casing 39 is further provided, substantially midway of the height thereof, with an annular exhaust passageway 45 having an exhaust opening or port 46 formed in the wall thereof adapted to register with the exhaust passageway 36, while the upper casing 40 is also further provided with a chamber 47 having a downwardly inclined passageway 48 for the starting air leading thereinto as more clearly illustrated in Figure 4.

The central passageway 42 is adapted to alternately communicate at proper intervals with the annular exhaust passageway 45 and the chamber 47 by means of an axially aligned tubular or transfer valve 50 disposed for reciprocation within the central passageway 42.

Figures 4, 5:
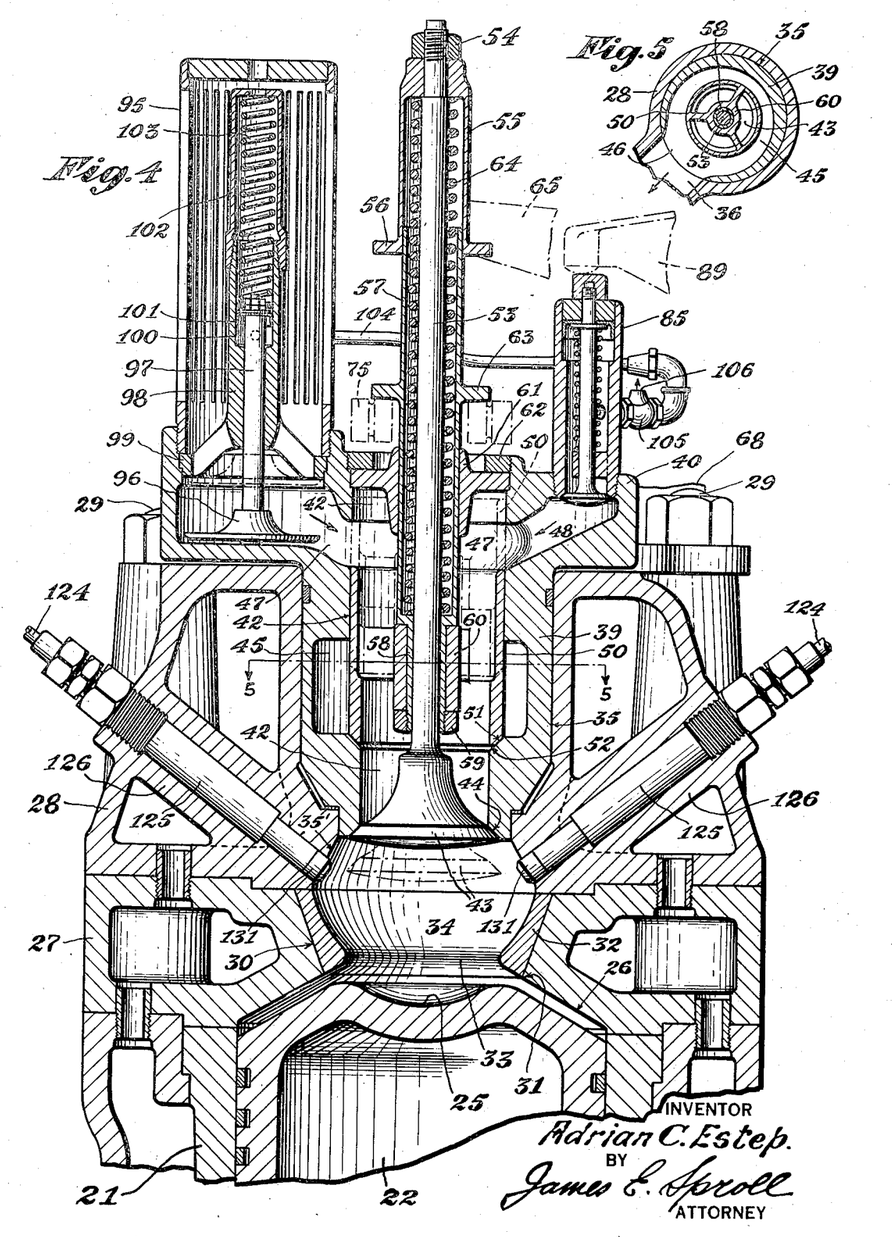
Figure 4 is an enlarged vertical transverse section of the cylinder head taken through 4—4 of Figure 2.
Figure 5 is a horizontal section taken through 5—5 of Figure 4.
Figure 6:
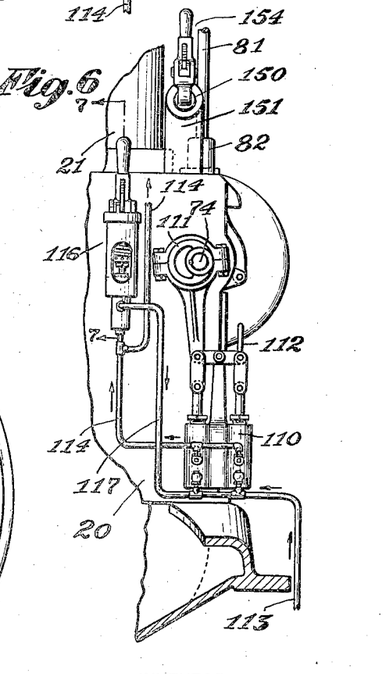
Figure 6 is a fragmentary elevation of the rear end of the engine.

The tubular valve 50 is provided at the lower end thereof with a seating face 51 arranged when said valve is in a lowered position see Figure 4, to cooperate with an annular seat 52 formed at the juncture of the central passageway 42 and the lower wall of the annular exhaust passageway 45. With the tubular valve 50 in a lowered and seated position, as indicated in full lines in Figure 4, the central passageway 42 is open to the chamber 47 and closed to the exhaust passageway 45, while, with the said valve in an elevated and overlapping position, as indicated in dot and dash lines in Figure 4, the central passageway 42 is open to the exhaust passageway 45 and closed to the chamber 47.

The valve 43 is provided with an operating stem 53 arranged to extend upwardly in axial prolongation to said valve and upon the upper end thereof is secured, as by a nut 54, an elongated cap member 55 having an integral peripheral collar 56 formed upon the lower end thereof. The tubular valve 50 is provided with an operating sleeve 57 adapted to enclose the stem 53; the internal diameter of said sleeve is slightly and uniformly greater than the diameter of said stem except at the lower end which is slightly reduced to form a guide portion 58 for the lower end of the stem 53. The guide portion 58 of the sleeve 57 is fixedly secured, as by a nut 59, within an axially aligned integral spider 60 formed within the tubular valve 50. The sleeve 57 extends upwardly through a guide member 61 fixedly secured within the upper wall of the upper casing 40, as by an annular nut 62, which guide member also serves as a closure for the upper end of the central passageway 42. The upper end of the sleeve 57 is adapted to be normally disposed within the lower end of the cap member 55, to thereby maintain the latter with its associated valve stem 53 in axial alignment. The sleeve 57 is provided exteriorly of the upper casing 40 with an integral peripheral collar 63 for a purpose hereinafter set forth. Surrounding the stem 53 and interposed between the shoulder formed by the guide portion 58 of the sleeve 57 and the inner end wall of the cap member 55 is a compression spring 64 adapted to normally retain the valve 43 and the tubular valve 50 upon their associated seats.

The valve 43 is operated by a rocker arm 65 fulcrumed upon an eccentric 66 keyed to a rocker shaft 67 mounted for oscillatory movement in a bracket 68 fixedly secured to the cylinder head 28 by two of the stud bolts 29 thereof, said rocker arm having a bifurcated inner end arranged to straddle the cap member 55 and to engage the upper face of the collar 56 thereof. Pivotally secured to the outer end of the rocker arm 65 is a depending push rod 69 guided for reciprocation, at the lower end thereof, within a spring cage 70 and a housing 71 which may be formed integral with or otherwise fixedly secured to the crank case of the engine, said push rod having a tappet roller 72 mounted upon the lower end thereof that cooperates with a cam 73 keyed to a cam shaft 74 journalled in the said crank case. The cam 73 comprises a primary projection $73^1$ and an auxiliary projection $73^2$ extending in circumferential projection from one side of the primary projection $73^1$, as more clearly shown in Figure 12.

Figure 10:
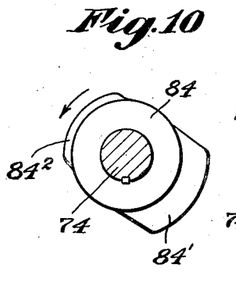
Figure 10 is an end elevation of the tubular transfer valve cam taken through the cam shaft at 10 in Figure 1.

The tubular valve 50 is operated by a rocker arm 75 fulcrumed upon a bracket 76 secured to the cylinder head 28, said rocker arm having a bifurcated inner end arranged to straddle the sleeve 57 and to engage the lower face of the collar 63 thereof. The outer end of the rocker arm 75 is also bifurcated and is provided with a roller 77 adapted to normally contact with a roller 78 carried by the inner end of a rocker arm 79 fulcrumed upon an eccentric 80 keyed to the rocker shaft 67. Pivotally secured to the outer end of the rocker arm 79 is a depending push rod 81 guided for reciprocation, at the lower end thereof, within a spring cage 82 and the housing 71, said push rod having a roller 83 mounted upon the lower end thereof that cooperates with a cam 84 keyed to the cam shaft 74. The cam 84 comprises a primary projection 84$^1$ and a diametrically opposed auxiliary projection 84$^2$, as shown more clearly in Figure 10.

Mounted in the inlet end of the passageway 48 is a timing inlet valve 85 controlling the passage of starting air to the engine, said valve being preferably of the conventional balance type, adapted to be connected to a source of fluid pressure through a pipe 86 and a manifold 87 controlled by a throttle valve 88. The timing inlet valve 85 is operated during the air starting period by a rocker arm 89 fulcrumed upon an eccentric 90 keyed to the rocker shaft 67, which rocker arm 89 is pivotally connected at the outer end thereof to a depending push rod 91 guided for reciprocation at the lower end within a spring cage 92 and the housing 71, said push rod having a roller 93 mounted upon the lower end thereof that cooperates with a cam 94 keyed to the cam shaft 74. The cam 94 comprises substantially diametrically opposite uniform projections 94$^1$ and 94$^2$.

Mounted upon one end of the upper casing 40 and communicating with the chamber 47 formed therein is an air louver or intake 95 through which the combustion air passes to the engine during the normal operation thereof. Axially disposed within the air louver 95 is a check valve 96 adapted to remain in a lowered or open position, as indicated by full lines in Figure 4, during the aforesaid normal operation, to permit of the free and uninterrupted passage of the combustion air through the chamber 47 to the engine, but is also adapted to be elevated to a closed position as indicated by dot and dash lines Figure 4 during the air starting period to prevent escape of the starting air through the said louver 95. The check valve 96 is provided with a stem 97 guided for reciprocation in a spider 98, the lower end of which is provided with a seat 99 for the valve 96, while the upper end is provided with a cylinder 100 adapted to receive a piston 101 fixedly secured to the upper end of the stem 97. The cylinder 100 is provided with a closure cap 102 and interposed between the piston 101 and the cap 102 is a compression spring 103 adapted to maintain the valve 96 in the open position indicated in full lines in Figure 4. To actuate the piston 101 and its associated valve 96 fluid pressure is admitted through a conduit 104, which conduit connects the lower end of the cylinder 100 with the timing inlet valve 85, at a point substantially midway of the height thereof.

Interposed in the conduit 104 is a three-way valve 105, which during the air starting period connects the timing inlet valve 85 with the cylinder 100 admitting fluid pressure thereto, but during the normal operation of the engine the valve 105 is closed to the timing inlet valve 85, to thereby exhaust the fluid pressure in the cylinder 100 to the atmosphere through the vent 106 of the valve 105. To operate the three-way valve 105 the stem of said valve is provided with a lever handle 107 pivotally connected at the outer end to the lower end of an arcuate link 108, the upper end of which is similarly connected to a lever 109 keyed to the rocker shaft 67.

Figure 7:
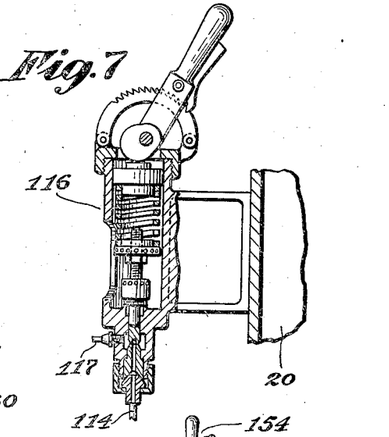
Figure 7 is a vertical medial section of the fuel relief valve taken through 7—7 of Figure 6.

The fuel injection system of the engine comprises a double plunger pump 110 actuated by an eccentric 111 from the cam shaft 74 and provided with a hand priming lever 112. The cylinders of the pump 110 on the suction side are connected to a common suction conduit 113 leading from a suitable source of fluid fuel, not shown, and on the delivery side are connected to a common delivery conduit 114 connected at the upper end to the inlet end of a manifold 115. Interposed in the delivery conduit 114 is a fuel relief valve 116 preferably of the type shown more clearly in Figure 7, having the relief or exhaust side thereof connected by a conduit 117 to the suction side of the pump 110.

Figure 8:
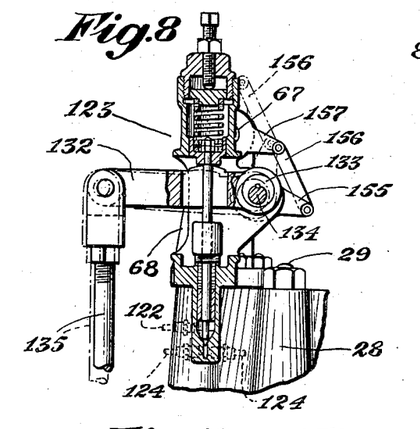
Figure 8 is a similar section of the fuel metering valve taken through 8—8 of Figure 1.
Figure 9:
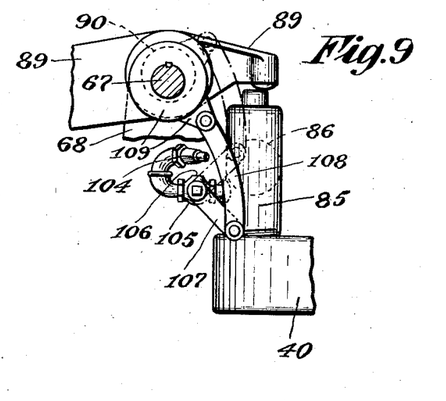
Figure 9 is an end elevation of the actuating mechanism of the air starting timing inlet valve taken at 9 of Figure 1.

Disposed upon the outlet end of the manifold 115 is a needle valve 118 adapted to establish communication between the manifold 115 and a pressure gauge 119 and a fuel oil receiver 120 adapted to maintain, by the compression of the trapped air therein, uniform pressure of the fluid fuel in the said manifold 115. Interposed at intervals in the manifold 115 is a combination T and fuel stop valve 121 for each engine cylinder 21. The outlet end of the stop valve 121 is connected by a conduit 122 to the inlet side of a fuel metering valve 123 preferably of the type disclosed more clearly in Figure 8. The outlet side of the fuel metering valve 123 is connected by conduits 124 to the inlet ends of equidistant fuel injection valves 125 mounted in convergent and diametrically opposed relation within downwardly inclined sockets 126 formed in the water jacketed walls of the cylinder head 28 in such a manner that the outlet ends of said injection valves project slightly within the combustion chamber 34.

By providing an individual fuel metering valve 123 for each cylinder 21 of the engine and disposing said valve midway between the associated fuel injection valves 125 thereof supplied with fluid fuel from the manifold 115 wherein the said fluid fuel is maintained at a uniform pressure a positive injection, atomization and combustion at all engine speeds is assured, where heretofore engines of the direct or solid injection type have been provided with fuel pumps individual to each cylinder, which arrangement causes slow injection at beginning and ending of each injection period, thus resulting in poor atomization of the fluid fuel and improper combustion thereof at all engines speeds.

Figure 14:
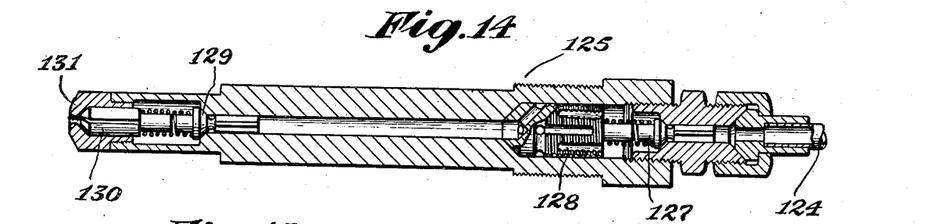
Figure 14 is an enlarged longitudinal section of the fuel injection valve.
Figure 15:
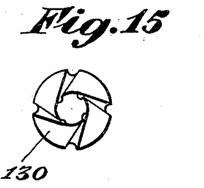
Figure 15 is an elevation of the outer end of the spray element of the fuel injection valve.
Figure 16:
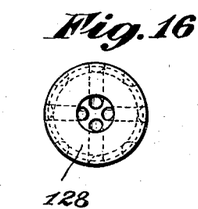
Figure 16 is an elevation of the forward end of the strainer element of the fuel injection valve.

The fuel injection valves 125 are preferably of the type illustrated in Figure 14, wherein it will be observed that the fluid fuel flowing past the spring check valve 127, is driven through a strainer 128 fitting within the bore of the valve 125 and thence past a second spring check valve 129 through a plurality of longitudinal grooves cut in the periphery of a cylindrical atomizing member 130 fitting the bore of the nozzle 131 and thence through tangentially disposed grooves cut in the frustro-conical end of the member 130 receiving therefrom a violent whirling motion, in which state it emerges from the nozzle orifice in the form of a cone-shaped atomized spray.

Figures 11, 12, 13:
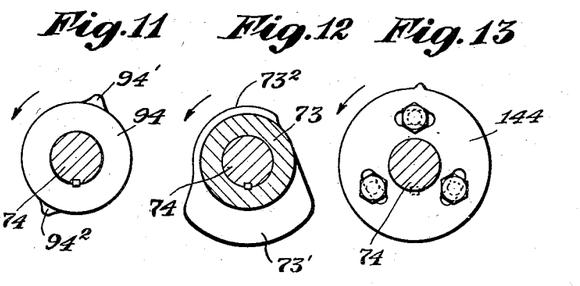
Figure 11 is a similar elevation of the air starting timing inlet valve cam taken through the cam shaft at 11 in Figure 1.
Figure 12 is a similar elevation of the mono-valve cam taken through the cam shaft at 12 in Figure 1.
Figure 13 is a similar elevation of the fuel metering valve cam taken through the cam shaft at 13 in Figure 1.

The fuel metering valve 123 is adapted to simultaneously furnish at predetermined intervals and at uniform pressure an equal charge of fluid fuel to each of the fuel injection valves 125, this action is obtained by suitable operating mechanism comprising a slotted lever 132 adapted to surround and cooperate with the spring pressed stem of said valve. The lever 132 is fulcrumed at the inner end thereof upon an eccentric 133 keyed to a pin 134 journalled for oscillation in the casing of the valve 123, while the outer end of the lever 132 is pivotally connected to a depending push rod 135 similarly connected at the lower end thereof to a lever 136 fulcrumed upon an eccentric 137 keyed to a pin 138 mounted for oscillatory movement in a bracket 139 fixedly secured to the engine crank case. The outer end of the lever 136 is provided with an adjustable pin 140 the lower end of which is adapted to abut the upper end of a reciprocative tappet 141 guided for reciprocation within a casing 142 and the housing 71, said tappet having a roller 143 mounted upon the lower end thereof that cooperates with a cam 144 loosely mounted upon the cam shaft 74 and adapted to be secured to the hub of the valve cam 73 for circumferential adjustment with respect thereto, as shown in Figures 1 and 13.

Fixedly secured to the inner end of the pin 138 is an upwardly extending lever 145 pivotally secured at the upper end to one end of a reciprocative connecting bar 146 similarly secured at the opposite end to a similar lever of the adjacent cylinder. The connecting bar 146 at the forward end is reciprocatively connected to the engine governor 147 through a system of links and levers 148 and at the rear end is pivotally connected to a rod 149 having its outer end slidably disposed in a sleeve 150 mounted for sliding movement in a bracket 151 fixedly secured to the engine crank case. Interposed between the inner end of the sleeve 150 and a collar 152 fixedly secured upon the rod 149 is a compression spring 153. Pivotally secured upon the bracket 151 is a manually controlled quadrant lever 154 having a disk shaped lower end adapted to abut the outer end of the sleeve 150, as illustrated more clearly in Figure 1, wherein the lever is shown in a fully retracted position. As the control lever 154 is advanced the spring 153 is compressed thus increasing the spring load on the governor 147. Manifestly by advancing or retracting the manual control lever to increase or decrease the spring load on the engine governor, the speed and power of the engine is regulated and varied as desired.

Figure 1:
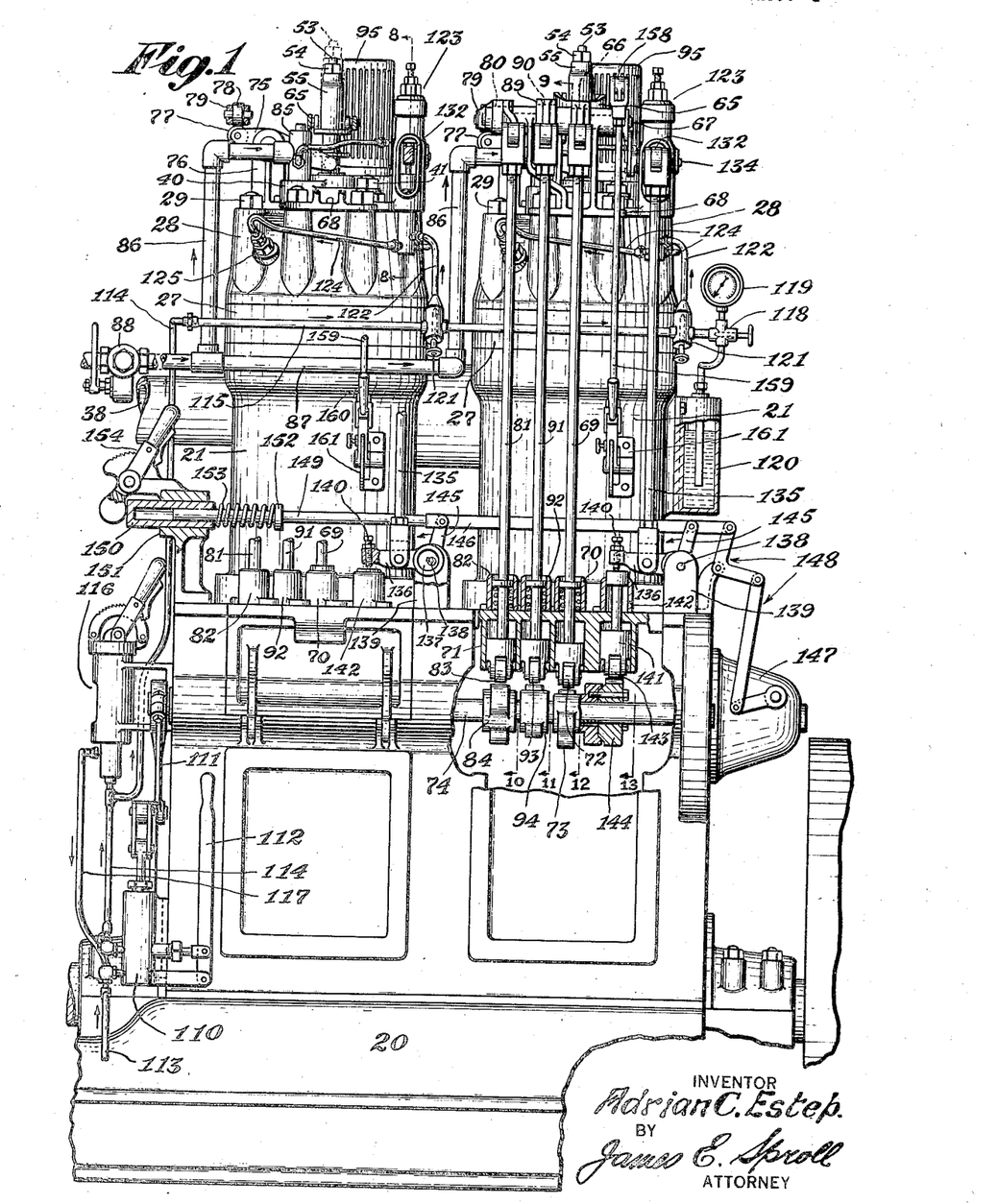
Figure 1 is a side elevation of a two cylinder engine fabricated in accordance with the invention, certain parts being shown in section and certain other parts broken away or omitted for clearness of illustration.
Figure 2:
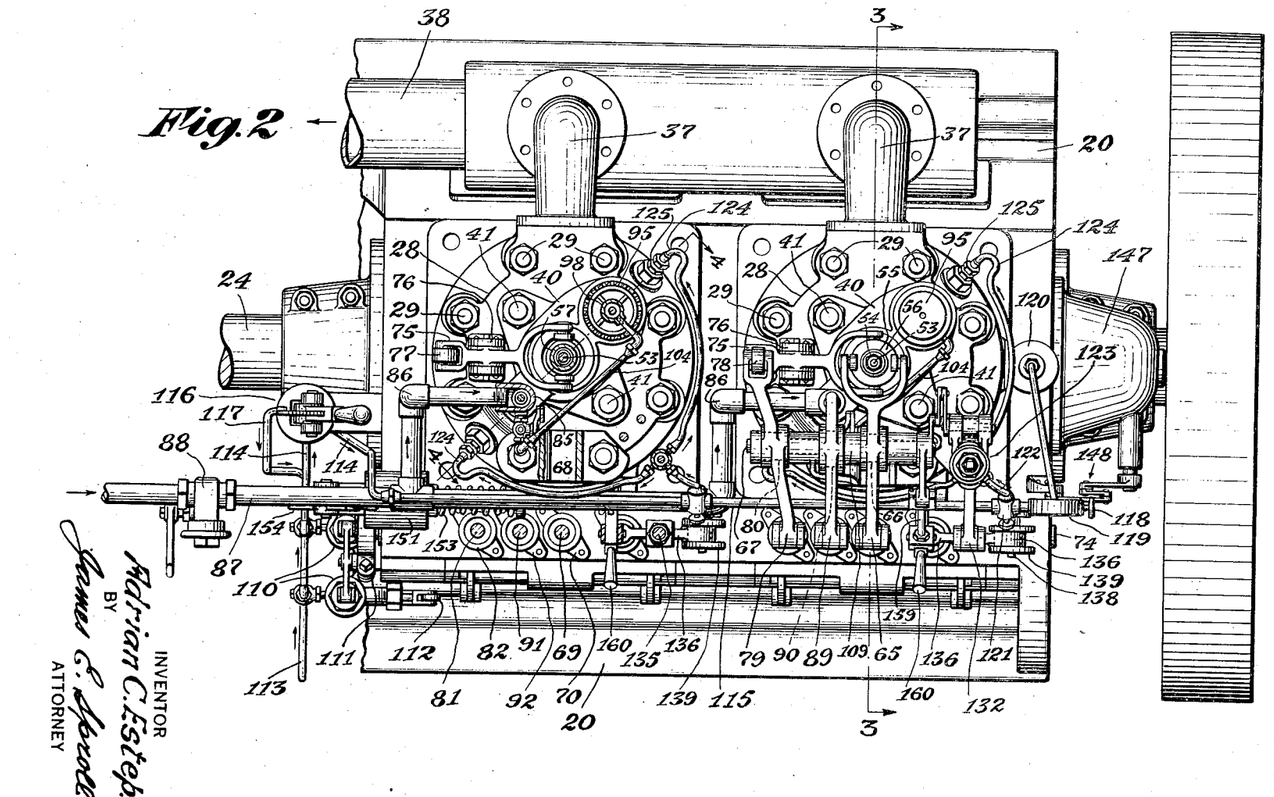
Figure 2 is a top plan of such an engine, certain parts being shown in horizontal section.

In Figure 1 the lever 145 and the associated system of links and levers 148 thereof are shown in a position of full speed or maximum power, with the eccentric 137 elevated, thereby raising the adjacent end of the lever 136, which in turn elevates the depending push rod 135 with a corresponding elevation of the outer end of the slotted lever 132 causing the latter to abut the spring pressed stem of the fuel metering valve 123, to thereby provide for the maximum and instant lift of said valve. As the speed of the engine increases the lever 145 is moved in the direction of the arrow, see Figure 1, through the action of the engine governor 147, thus depressing the eccentric 137 and lever 136 causing a downward movement of the push rod 135 and the slotted lever 132 and moving the latter out of contact with the spring pressed stem of the fuel metering valve 123, to thereby retard and vary the lift of said valve. It will be apparent from the foregoing and by referring to Figures 1 and 8, that by compounding the leverage of the fuel metering valve actuating and controlling mechanism, as described and shown, extremely delicate and accurate adjustment of the lift of said valve is obtained, approximately two hundredth of an inch at full power, said compounding permitting of the use of a cam of reasonable proportions.

The fuel metering valve 123 is designed to remain closed during the air starting period, thereby cutting off the supply of fluid fuel to the combustion chamber 34; this action is obtained by providing one end of the oscillatory pin 134 of said valve 123 with an actuating lever 155 rigidly secured thereon and pivotally connected at the outer end to a link 156 the upper end of which is similarly connected to a lever 157 keyed to the rocker shaft 67. With the cut-off mechanism in the position shown in full lines in Figure 8 the fulcrum point of the slotted lever 132, which is the center of the eccentric 133, is in the maximum elevated position for normal operation in conjunction with the associated governor controlled mechanism, but with the said cut-off mechanism in the cut-off position shown in dot and dash lines in said figure, the fulcrum point of said bifurcated lever is depressed to the maximum thereby lowering the inner end thereof, so that the travel of the push rod 135 during the air starting period is insufficient to affect or open the fuel metering valve regardless of the position of the aforesaid governor controlled mechanism.

Figure 3:
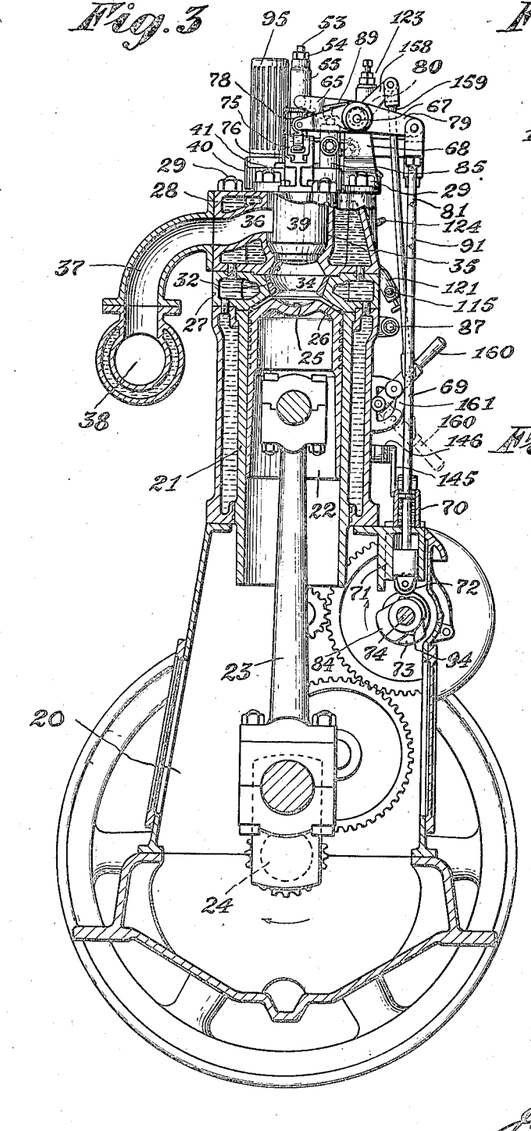
Figure 3 is a vertical transverse section taken through 3—3 of Figure 2.

The rocker shaft 67 is actuated during the air starting period by a rocker arm 158 rigidly secured thereto and pivotally connected to the outer end of the arm 158 is a rod 159 similarly connected at the lower end thereof to a starting lever 160 pivotally mounted upon a semi-circular bracket 161 rigidly secured to the wall of the cylinder 21. The starting lever 160 during normal operation of the engine is disposed in the elevated position indicated in full lines in Figures 1 and 3 and during the air starting period is disposed in the depressed position indicated in dot and dash lines Figure 3, and is adapted to be clamped in an elevated or depressed position upon the bracket 161 in any suitable manner.

The engine as above described is designed for two cycle operation during the air starting period and for four cycle operation during normal running.

When the engine as described is to be started, the flywheel thereof is first turned over to depress the inner end of one of the rocker arms 89 to open one of the timing inlet valves 85, in the event that both are closed, the starting levers 160 are then depressed to the starting position, thereby lowering the fulcrum points of the eccentrically mounted rocker arms 65, 79 and 89 thus taking up the normal or extra clearance of the associated tappet roller 72, 83 and 93 on their respective cams 73, 84 and 94 by moving said tappet rollers into the circumferential paths of the auxiliary cams $73^2$ and $84^2$ and air starting projections $94^1$ and $94^2$, to thereby actuate the valve 43, tubular valve 50 and timing inlet valve 85 in proper phase for two cycle air starting operation. The downward movement of the starting levers 160 also opens the three-way valves 105 to thereby connect the timing inlet valves 85 with the cylinders 100 of the check valves 96, said downward movement of said levers also simultaneously cutting out the fuel metering valves 123, as hereinbefore described. The throttle valve 88 is opened admitting fluid pressure to the timing inlet valves 85 and to the cylinders 100 of the check valves 96 closing said valves. With the timing inlet valve 85 opened, by the projection 94, to the central passageway 32 fluid pressure passes to the power cylinder 21 through the valve 43, which has been previously opened by the auxiliary projection $73^2$, causing a downward stroke of the piston 22. Upon the ensuring upstroke of the piston 22 the valve 43 is opened by the primary projection $73^1$ and the tubular valve 50 is also opened to the exhaust by the primary projection $84^1$, whereby the starting air is expelled therethrough. On the second downward stroke of the piston 22 the tubular valve 50 is closed, the timing inlet valve 85 is again opened by the projection $94^2$, the valve 43 being held open by the projection $73^1$ to admit starting air to power cylinder, as before. Upon the second upstroke the valve 43 is held open by the projection $73^2$ and the tubular valve 50 again opened to the exhaust by the projection $84^2$ and the starting air again expelled therethrough.

To change the engine over from the two-cycle air starting operation to four-cycle normal operation, the fuel stop valves 121 are opened and the pump 110 primed by the lever 112 to expel all air in the fuel feed lines and manifold after which the individual cylinders are changed over in succession, this is done by elevating the starting lever 160 to raise the fulcrum points of the eccentrically mounted rocker arms 67, 79 and 89, thus raising the associated tappet rollers 72, 83 and 93 thereof out of the circumferential path of the auxiliary cams $73^2$ and $84^2$ and the air starting projections $94^1$ and $94^2$, to thereby actuate the valve 43 and the tubular valve 50 in proper phase for four-cycle operation. The upward movement of the starting lever 160 closes the three-way valve 105 to thereby vent the cylinder 100 and permits the check valve 96 to open by gravity supplemented by the spring 103, said upward movement of said lever simultaneously cutting in the fuel metering valve 123 for normal operation. The throttle valve 88 is closed cutting off fluid pressure to the timing inlet valve 85, which remains inoperative during normal running of the engine. In the engine cycle air for combustion is drawn in through the louver 95 and on the suction stroke the valve 43 is opened by the primary projection $73^1$ while the tubular valve 50 remains closed to the exhaust and on the ensuing or compression stroke the valve 43 is closed causing the trapping and compression of the air within the combustion chamber 34, to an approximate pressure of 350 pounds per square inch and raising the temperature of the same to approximately 900° Fahrenheit. The fuel metering valve 123 is opened by the cam 144 at the required lead, approximately 7° before top center, allowing fluid fuel to be sprayed or atomized into the combustion chamber 34 through the fuel injection valves 125, where it is ignited by the heated compressed air. On the ensuing down or power stroke complete combustion of the fluid fuel takes place, part of the combustion taking place with constant volume and part at constant pressure; during the power stroke the valve 43 remains closed but the tubular valve 50 is opened to the exhaust by the primary projection 84[1], which action of tubular valve 50 cuts off the combustion air to the central passageway 42. On the ensuing up or exhaust stroke the valve 43 is opened at the required lead approximately 30° by the primary projection 73[1] permitting of the exhaust gases passing outwardly therethrough to the exhaust manifold 38. As the piston 22 passes top center the tubular valve 50 is closed to the exhaust and opened to the combustion air; the valve remains open for the suction stroke of the succeeding cycle. As the combustion air for the succeeding suction stroke enters the central passageway 42 it cools and completely scavenges the same and passes downwardly over the valve 43 cooling said valve, and such air, by reason of the deflector effect of the head of the valve, but particularly by reason of the substantially spherical shape of the combustion chamber, in its relation to the said valve, as hereinbefore described, enters in the form of a flat expanding disk, flowing radially outward and thence sweeping downwardly along the walls of said chamber and the concave face 25 of the piston 22, thereby effectually scavenging the chamber of its residual combustion gases and consuming incipient deposits of carbon formed thereon.

The scavenging of the central passageway 42 takes place prior to the entrance of the combustion air to the combustion chamber 34 due to a partial vacuum created in said passageway by the inertia of the exhausting gases and to the fact that the initial portion of such air is admitted to said passageway prior to the closing of the exhaust end of the tubular valve 50 for the reason that the inlet or overlapping end of said valve uncovers the air inlet end of the passageway 42 before the annular exhaust passageway 45 is closed. The symmetrical and substantially spherical shape of the combustion chamber 34 having the fuel injection valves 125 disposed symmetrically with relation to the main axis thereof and in a position and at an inclination to reach directly all of the combustion air therein establishes a condition in which practically the whole charge of compressed combustion air is penetrated by oil particles, thereby expediting the intermixing of the air with the atomized fluid fuel, which intermixing action is supplemented and accelerated by the turbulent or agitated condition of the gaseous mixture during the injection period, thus resulting in proper and complete combustion. The substantially spherical shape of the combustion chamber also provides the maximum combustion space with the minimum exposed wall area, thereby reducing the loss of heat and thermal efficiency of the fuel through unnecessary radiation.

While I have herein shown and described my invention with sufficient detail to enable those skilled in the art to understand the mode of construction and the principles involved, it is to be understod that there is no intentional limitation herein to the specific form and precise details of construction of the invention shown and described, except as expressly defined by the appended claims, and that various modifications of said construction may be resorted to without departing from the invention or the benefits derivable therefrom. I also desire it to be understood that certain features of the invention herein shown and described may be employed in other combinations than those herein shown.

What I claim as my invention, and desire to secure by Letters-Patent, is:

1. An internal combustion engine having a combustion chamber supplied with combustion air and fluid fuel and provided with fuel injection means delivering a charge of fluid fuel thereinto, an inlet-outlet valve disposed in the wall of said chamber, in combination with a power cylinder communicating with said combustion chamber, through a restricted opening, a reciprocative piston disposed in said cylinder having a frusto-conical centrally concaved working face adapted to co-operate with said opening at top dead center to form the lower wall of said chamber, and valve actuating mechanism whereby said fluid fuel is injected into the chamber at or about compression dead center.

2. In combination with the combustion chamber of an internal combustion engine, of an interchangeable valve cage removably seated in the wall of said combustion chamber having inlet and outlet openings formed therein, an inwardly opening valve seated within the inner end of said cage for controlling communication between the cage interior and said combustion chamber, an operating stem for said valve extending upwardly through the said cage in axial prolongation thereto, a cap rigidly secured upon the upper end of said stem, a reciprocative tubular valve having a frusto-conical seat at its lower end seatable within said cage and for alternately registering the inlet and outlet openings thereof with the cage interior, an operating sleeve for said tubular valve extending upwardly therefrom through said cage to surround and enclose said operating stem in spaced concentric relation, a compression spring surrounding said operating stem and interposed between the cap thereof and the inner end of said sleeve for closing said valves, and mechanisms for actuating said valves at proper intervals.

3. An internal combustion engine having a symmetrical combustion chamber provided with fuel injection means for delivering a charge of fluid fuel thereinto, said chamber having an axially aligned constricted opening leading to the engine cylinder and an inlet-outlet opening leading outwardly therefrom in axial alignment with said constricted opening, valve means disposed in said inlet-outlet opening for controlling the ingress of air to the chamber and the egress of exhaust gases therefrom, and a reciprocative piston disposed in said cylinder having a frusto-conical centrally concaved working face for co-operating with said constricted opening at top dead center to form the lower wall of said chamber, in combination with associated mechanisms for actuating the fuel injection means and valve means at proper intervals.

4. An internal combustion engine having a symmetrical and substantially spherical combustion chamber provided with fuel injection means for delivering a charge of fluid fuel thereinto, said chamber having an axially aligned constricted opening leading to the engine cylinder and an inlet-outlet opening in axial alignment with said constricted opening for communicating with a source of combustion air and an exhaust outlet, an inlet-outlet valve disposed in said inlet-outlet opening for alternately registering the source of combustion air and the exhaust outlet with the combustion chamber, and a reciprocative piston disposed in said cylinder having a frusto-conical centrally concaved working face for co-operating with said constricted opening at top dead center to form the lower wall of said chamber, in combination with associated mechanisms for actuating the fuel injection means and inlet-outlet valve at proper intervals.

5. An internal combustion engine having a symmetrical combustion chamber supplied with combustion air and fluid fuel and provided with fuel injection means delivering a charge of fluid fuel thereinto, an interchangeable valve cage removably seated in the wall of said chamber in axial alignment therewith and provided with a valve controlled central passageway leading thereto, said passageway having an air intake and exhaust outlet, a valve seated within said passageway for alternately registering the air intake and the exhaust outlet with the combustion chamber, in combination with an engine cylinder communicating with the combustion chamber, associated mechanisms whereby the charge of air drawn through said valve is compressed and the fuel injected therein at or about compression dead center and a reciprocative piston disposed in said cylinder having a frusto-conical centrally concaved working face for co-operating with said constricted opening at top dead center to form the lower wall of said chamber.

6. An internal combustion engine having a symmetrical and substantially spherical combustion chamber supplied with combustion air and fluid fuel and provided with fuel injection means delivering a charge of fluid fuel thereinto, an interchangeable valve cage removably seated within the wall of said chamber in alignment with the axis thereof and provided with a central inlet-outlet passageway leading thereto, said passageway having a combustion air intake and an exhaust outlet, an inlet-outlet valve seated within the lower end of said passageway for controlling communication between the latter and said chamber, a hollow piston valve slidably disposed within said passageway for alternately registering the air intake and exhaust outlet therewith, in combination with an engine cylinder communicating with said combustion chamber, associated mechanisms whereby air is compressed in said chamber and the fluid fuel injected therein at or about compression dead center, and a reciprocative piston disposed in said cylinder having a frusto-conical centrally concaved working face for co-operating with said constricted opening at top dead center to form the lower wall of said chamber.

7. An internal combustion engine having a combustion chamber provided with fluid fuel injection means delivering a charge of fluid fuel thereinto, an interchangeable valve cage removably seated within the wall of said chamber in alignment with the axis thereof having a central inlet-outlet passageway leading thereto, said passageway having an elongated inlet chamber and an annular outlet chamber communicating therewith, an inlet-outlet valve seated within the lower end of said passageway for controlling communication between the latter and said chamber, a tubular valve slidably disposed within said passageway for alternately registering the elongated inlet chamber and annular outlet chamber therewith, in combination with an engine cylinder communicating with the combustion chamber, associated mechanisms whereby air is compressed in said chamber and the fluid fuel injected therein at or about compression dead center, and a reciprocative piston disposed in said cylinder having a frusto-conical centrally concaved working face for co-operating with said constricted opening at top dead center to form the lower wall of said chamber.

In testimony whereof I affix my signature.

ADRIAN C. ESTEP.